United States Patent
Lee et al.

(10) Patent No.: US 7,586,546 B2
(45) Date of Patent: Sep. 8, 2009

(54) VIDEO SIGNAL PROCESSING CIRCUIT HAVING A BYPASS MODE AND DISPLAY APPARATUS COMPRISING THE SAME

(75) Inventors: Jung-bae Lee, Anyang-si (KR); Jae-hong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 685 days.

(21) Appl. No.: 11/268,623

(22) Filed: Nov. 8, 2005

(65) Prior Publication Data

US 2006/0132657 A1 Jun. 22, 2006

(30) Foreign Application Priority Data

Dec. 21, 2004 (KR) ...................... 10-2004-0109393

(51) Int. Cl.
*H04N 5/66* (2006.01)
(52) U.S. Cl. .................................................. 348/625
(58) Field of Classification Search ................. 348/625, 348/705, 687, 673, 683, 706, 65
See application file for complete search history.

(56) References Cited

U.S. PATENT DOCUMENTS

| | | | | |
|---|---|---|---|---|
| 5,307,377 A | * | 4/1994 | Chouly et al. ............... | 375/261 |
| 5,412,478 A | * | 5/1995 | Ishihara et al. ................ | 348/72 |
| 5,646,680 A | * | 7/1997 | Yajima ......................... | 348/74 |
| 6,246,432 B1 | * | 6/2001 | Takami et al. ................. | 348/65 |
| 6,353,460 B1 | * | 3/2002 | Sokawa et al. ............. | 348/555 |
| 6,901,207 B1 | * | 5/2005 | Watkins ........................ | 386/83 |
| 7,450,176 B2 | * | 11/2008 | Koh ........................... | 348/383 |
| 2002/0057362 A1 | | 5/2002 | Wredenhagen et al. | |

FOREIGN PATENT DOCUMENTS

| | | |
|---|---|---|
| CN | 1246240 A | 3/2000 |
| JP | 58-191577 A | 11/1983 |
| JP | 01-95679 A | 4/1989 |

(Continued)

OTHER PUBLICATIONS

Sharp "LC-32/37G4U/TU-GA1U/S Operation-Manual GB" Nov. 2004, pp. 1-107 Internet Citation retrieved on May 8, 2008.

(Continued)

*Primary Examiner*—Paulos M Natnael
(74) *Attorney, Agent, or Firm*—Sughrue Mion, PLLC

(57) ABSTRACT

A display apparatus having a display. The display apparatus includes a video signal processor having a processor to process an input video signal and a picture quality improving part to improve picture quality of the processed video signal. The video signal processor processes the video signal through a path that includes a signal processing path to selectively bypass the picture quality improving part. The display apparatus further includes a selection input part through which the user selects a bypass mode corresponding to the signal processing path. Finally, the display apparatus has a controller controlling the video signal processor to output the video signal processed through the processor to the display after bypassing the picture quality improving part when the user selects the bypass mode through the selection input part. Thus, the picture quality improving function may be omitted to thereby reduce signal processing time.

13 Claims, 6 Drawing Sheets

FOREIGN PATENT DOCUMENTS

| | | |
|---|---|---|
| JP | 1-264380 A | 10/1989 |
| JP | 04-104596 A | 4/1992 |
| JP | 9-181973 A | 7/1997 |
| JP | 10-164508 A | 6/1998 |
| JP | 2005-338605 A | 8/2005 |
| KR | 2003-0049496 A | 6/2003 |
| KR | 10-0425315 B1 | 8/2004 |

OTHER PUBLICATIONS

Sharp: "Bedienungs Anleitungen—LC-32/37G4U/TU-GA1U/S Operational Manual GB" pp. 1-106, Internet Citation retrieved on May 8, 2008.

* cited by examiner

A. CURRENT OUTPUTTING PICTURE OF A GAME DEVICE

B. A DELAYED GAME PICTURE WHICH A USER SEES

GENERATING A DELAY WHEN A VIDEO SIGNAL IS PROCESSED

GENERAL MODE

GAME MODE 1(FIRST BYPASS MODE)

GAME MODE 2(SECOND BYPASS MODE)

GAME MODE 3(THIRD BYPASS MODE)

VIDEO SIGNAL PROCESSING CIRCUIT HAVING A BYPASS MODE AND DISPLAY APPARATUS COMPRISING THE SAME

CROSS-REFERENCE TO RELATED APPLICATIONS

This application claims priority from Korean Patent Application No. 2004-0109393, filed on Dec. 21, 2004, in the Korean Intellectual Property Office, the disclosure of which is incorporated herein by reference.

BACKGROUND OF THE INVENTION

1. Field of the Invention

The present invention relates to a video signal processing circuit and display apparatus comprising the same and, more particularly, to a video signal processing circuit and display apparatus comprising the same which are able to turn on/off a picture quality improving function when an input video signal is processed.

2. Description of the Related Art

Generally, when a video signal of a display apparatus is processed, a signal processing method is changed from an analog-type to a digital-type, and the video signal is generally processed per frame. Then, the display apparatus widely uses a signal processing integrated circuit (IC) which processes the signal by using a frame memory.

Herein, the video signal processing IC comprises an IC to improve the picture quality as well as to perform basic signal processing.

A signal processing path using a conventional display apparatus comprising the signal processing IC for improving the picture quality is described with reference to FIG. 1.

By way of an example, FIG. 1 illustrates a signal delay due to the signal processing, when an external source is a game device.

As shown in section (a) of FIG. 1, a picture corresponding to a video signal output from the game device, as the current external source, is an image, which shows that a basketball reached a strike zone.

However, the picture illustrated in section (b) of FIG. 1 and displayed in the display apparatus after processing the video signal through a decoder, a de-intelacer, a scaler, and an image-enhancer is an image which shows that the basketball did not reach the strike zone yet.

That is, the signal processing time is delayed in the signal processing IC such as the de-interlacer and the image-enhancer that uses the frame memory to improve the picture quality.

Accordingly, the time of the picture output from the game device requires a command about an action to strike the ball. However, because the signal processing is delayed, at the time when a user sees the picture, no key input is required.

That is, when the signal processing is delayed, it does not create a problem for the general video picture because the video picture does not interact with the user. However, a game picture interacts with the user and requires input from the user to the game device. Because of this signal processing delay, however, the video signal may be unsynchronized with user input.

The general signal processing illustrated in FIG. 1 usually makes the signal processing delay of about 150 msec. However, when the delay of the signal processing is over 100 msec, the user may miss the time to input a key

SUMMARY OF THE INVENTION

Accordingly, it is an aspect of the present invention to provide a video signal processing circuit and display apparatus comprising the same in which a user selects a bypass signal processing path which bypasses a picture quality improving function thereby reducing signal processing time for the convenience of the user.

Additional aspects and advantages of the invention will be set forth in part in the description which follows and, in part, will be obvious from the description, or may be learned by practice of the invention.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

The foregoing and other aspects of the present invention may be achieved by providing a display apparatus having a display and comprising: a video signal processor having a processor processing an input video signal and a picture quality improving part improving picture quality of the processed video signal. The video signal processor processes the video signal through a path comprising a signal processing path to selectively bypass the picture quality improving part. The display apparatus further includes a selection input part to select a bypass mode corresponding to the signal processing path; and a controller controlling the video signal processor to output the video signal processed through the processor to the display after bypassing the picture quality improving part when a user selects the bypass mode through the selection input part.

According to an aspect of the present invention, the video signal processor further comprises a switch switching the video signal output from the processor to be output to the picture quality improving part or the display.

According to another aspect of the present invention, the picture quality improving part comprises a plurality of picture quality improving ICs, and the controller controls the video signal processor to bypass at least one of the plurality of picture quality improving ICs when the user selects the bypass mode through the selection input part.

According to yet another aspect of the present invention, the selection input part comprises an OSD generator generating an OSD menu of the bypass mode and a predetermined input key to select the bypass mode through the OSD menu, and the controller further comprises a mode setting part to set a predetermined value corresponding to the bypass mode.

According to yet another aspect of the present invention, the processor comprises a decoder and a scaler selectively receiving the video signal output from the decoder, and the picture quality improving ICs comprise a de-interlacer and an image-enhancer selectively receiving the video signal from the scaler.

According to another aspect of the present invention, the switch comprises a first switch to output the video signal output from the decoder to the scaler or the de-interlacer.

According to another aspect of the present invention, the switch further comprises a second switch to output the video signal output from the scaler to the display or the image-enhancer.

According to another aspect of the present invention, the controller controls the first switch and the second switch to respectively output the video signal from the decoder to the scaler, and from the scaler to the display when the user selects a first bypass mode through the selection input part.

According to another aspect of the present invention, the controller controls the first switch and the second switch to respectively output the video signal from the decoder to the de-interlacer, and from the scaler to the display when the user selects a second bypass mode through the selection input part.

According to another aspect of the present invention, the controller controls the first switch and the second switch to respectively output the video signal from the decoder to the scaler, and from the scaler to the image-enhancer when the user selects a third bypass mode through the selection input part.

According to another aspect of the present invention, the controller controls the first switch and the second switch to respectively output the video signal from the decoder to the de-interlacer, and from the scaler to the display when the user selects a second bypass mode through the selection input part.

According to another aspect of the present invention, the controller controls the first switch and the second switch to respectively output the video signal from the decoder to the scaler, and from the scaler to the image-enhancer when the user selects a third bypass mode through the selection input part.

The foregoing and other aspects of the present invention may be achieved by providing a video signal processing circuit processing an input video signal and outputting the video signal to the display panel comprising: a processor processing the input video signal; a picture quality improving part improving picture quality of the processed video signal; and a switch to output the video signal processed through the processor to the picture quality improving part or the display panel.

The foregoing and other aspects of the present invention may be achieved by providing a video signal processing circuit comprising a decoder, a de-interlacer, a scaler, an image-enhancer, a first switch to output a video signal output from the decoder to the scaler or the de-interlacer, and a second switch to selectively output the video signal output from the scaler to the image-enhancer.

Another aspect of the present invention provides a method for avoiding delays associated with processing a video signal for a display is provided. In this method an input video signal is received by a processor and a mode for processing the received video signal is input by the user. The method further includes processing the received video signal according to the input mode. The mode includes a general processing mode in which quality of the received video signal is enhanced and a bypass mode in which improving the quality of the received video signal is omitted.

BRIEF DESCRIPTION OF THE DRAWINGS

The above and/or other aspects of the present invention will become apparent and more readily appreciated from the following description of the embodiments, taken in conjunction with the accompany drawings of which.

DETAILED DESCRIPTION OF THE EXEMPLARY EMBODIMENTS

Figure 1:
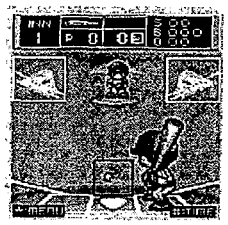
FIG. 1 illustrates a signal processing path and a picture of a display, respectively, according to a conventional display apparatus.
Figure 1:
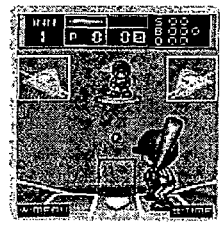
Figure 1:
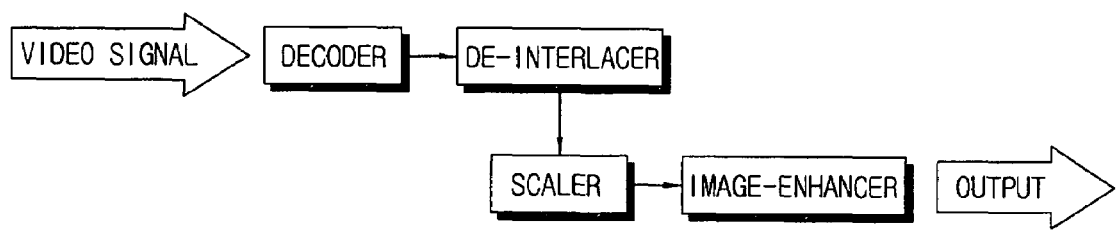

Reference will now be made in detail to the exemplary embodiments of the present invention, examples of which are illustrated in the accompanying drawings, wherein like reference numerals refer to like elements throughout.

Figure 2:
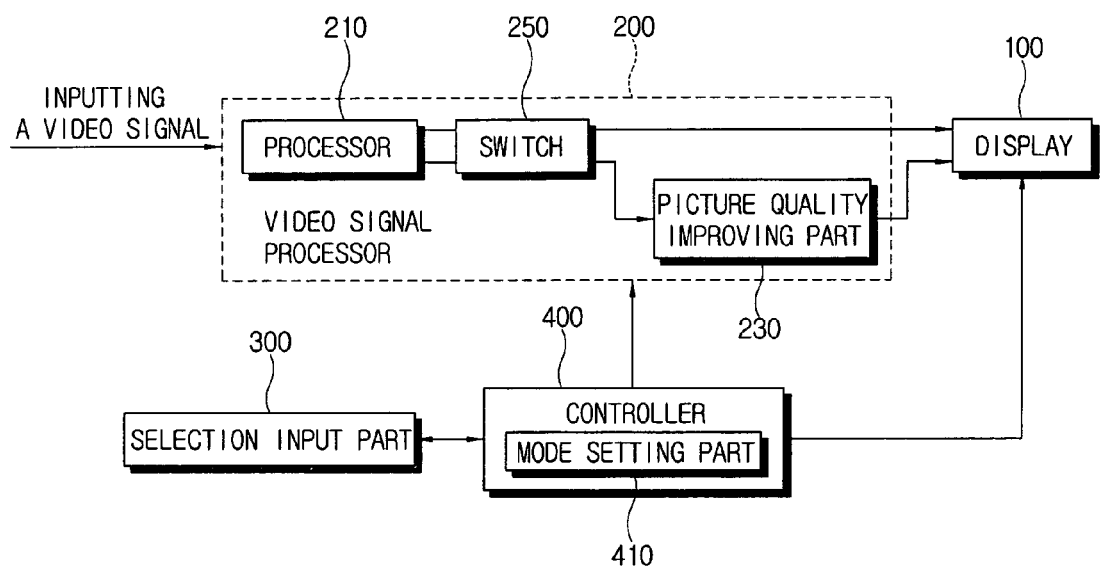
FIG. 2 is a block diagram of a display apparatus according to a first, exemplary embodiment of the present invention.

As shown in FIG. 2, a display apparatus according to a first exemplary embodiment of the present invention comprises a display 100 displaying a processed picture on a screen, a video signal processor 200 processing an input video signal, a selection input part 300 inputting a command, and a controller 400 generally controlling various configurations.

The display 100 displays on the screen a video signal processed in the video signal processor 200. The video signal processing is applied to various types of a display panel such as a DLP (Digital Light Processing), an LCD (Liquid Crystal Display), and a PDP (Plasma Display Panel).

The video signal processor 200 processes the input video signal so that it can be displayed on the display 100. The video signal processor comprises a processor 210 being employed for basic signal processing of the input video signal and a picture quality improving part 230 for improvement processing of picture quality to improve the picture quality of the processed video signal. Also, the video signal processor 200 comprises a frame memory (not shown) such as a buffer to store the video signal in an input terminal and an output terminal thereof to process the video signal.

Figure 4:
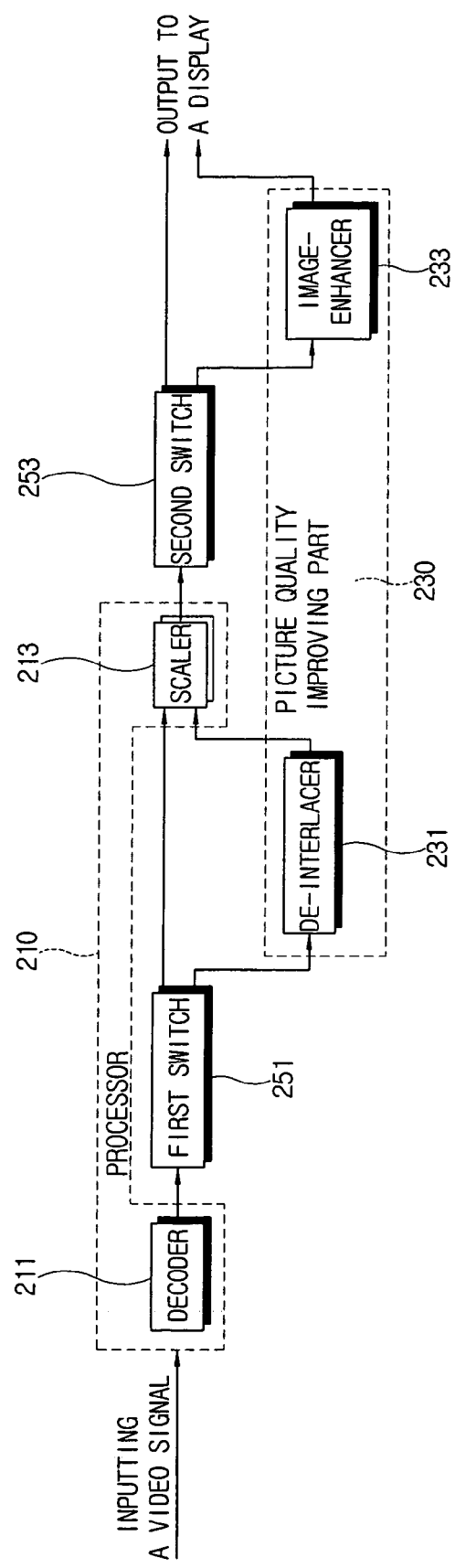
FIG. 4 is a block diagram of a video signal processor according to a second exemplary embodiment of the present invention.

As depicted in FIG. 4, for example, the processor 210 may comprise a decoder 211 and a scaler 213, etc.

The decoder 211 decodes the input video signal and may decode the video signal to various formats according to a coding method of the input video signal. For example, the decoder 211 may convert the video signal such as performing an analog/digital conversion, a color space conversion, and a picture quality adjustments.

The scaler 213 converts the decoded video signal to correspond to a vertical frequency, a resolution, and a ratio of the screen which are suitable for an output standard of the display 100. The decoder 211 and the scaler 213 are employed for the basic signal processing, i.e., to process the video signal.

The picture quality improving part 230 may comprise a plurality of picture quality improving ICs. In the example depicted in FIG. 4, the picture quality improving part 230 comprises at least one of a de-interlacer 231 and an image-enhancer 233, which are picture improving ICs.

The de-interlacer 231 converts the video signal of an interlace type decoded in the decoder 211 to the video signal of a progressive type, and transmits the video signal to the scaler 213.

The image-enhancer 233 improves the picture quality by adjusting the video signal output from the scaler 213.

The video signal processor 200 comprises a signal processing path to bypass the picture quality improving part 230. In other words, the video signal processor 200 comprises the signal processing path, in which the video signal processed in the processor 210 is directly output to the display 100 without passing through the picture quality improving part 230. Accordingly, the processor 210 and the display 100 are connected to directly transmit and receive the signal.

Also, if the picture quality improving part 230 comprises the plurality of picture quality improving ICs, the bypass signal processing path comprise a signal processing path to bypass at least one of these picture quality improving ICs.

Accordingly, if the picture quality improving part 230 comprises the plurality of picture quality improving ICs, a plurality of bypass signal processing paths are provided, and the signal processing ICs are connected thereto in various ways, according to the respective bypass signal processing paths.

As depicted in FIG. 2, the video signal processor 200 may comprise a switch 250 to switch the video signal output from the processor 210 to the display 100 or the picture quality improving part 230.

The video signal selectively bypasses the picture quality improving part 230 according to the operation of the switch 250. The switch 250 switches to selectively output the video signal to the picture quality improving part 230 or directly to the display 100 according to the video signal input to the switch 250.

The switch 250 may comprise a switching circuit formed in various ways. The switch 250 may be provided in a separate circuit from the processor 210 as depicted in FIG. 2, but a circuit in the processor 210 can be designed to output the video signal to the picture quality improving part 230 or the display 100. That is, the switch may be designed to be within the processor.

The selection input part 300 is provided to select a bypass mode when the video signal is processed, and comprises an on-screen display (OSD) generator generating an OSD menu and an input key to select the bypass mode from the OSD menu. The selection input part 300 comprises an OSD generating IC, an input button provided in front of the display apparatus and/or a keyboard.

The controller 400 controls the video signal processor 200 to process the input video signal through the processor 210, bypass the picture quality improving part 230, and directly output the input video signal to the display 100 when the user selects the bypass mode through the selection input part 300. Also, the controller 400 may comprise a microcomputer and/or a control device provided in the signal processing IC, etc.

The controller 400 comprises a mode setting part 410 (depicted in FIG. 2) in which a predetermined value corresponding to the selected bypass mode is set when the user selects the bypass mode. The mode setting part 410 comprises a memory or a register (not shown).

The controller 400 controls switching of the switch 250 by inputting the signal corresponding to the selected bypass mode to control the signal processing path when the user selects the bypass mode.

Accordingly, the user may select the bypass mode, in which the delay time of the signal processing is short, according to the intended use of the display apparatus.

A method of controlling the display on the display apparatus according to the first illustrative embodiment of the present invention is described with reference to FIG. 3.

Figure 3:
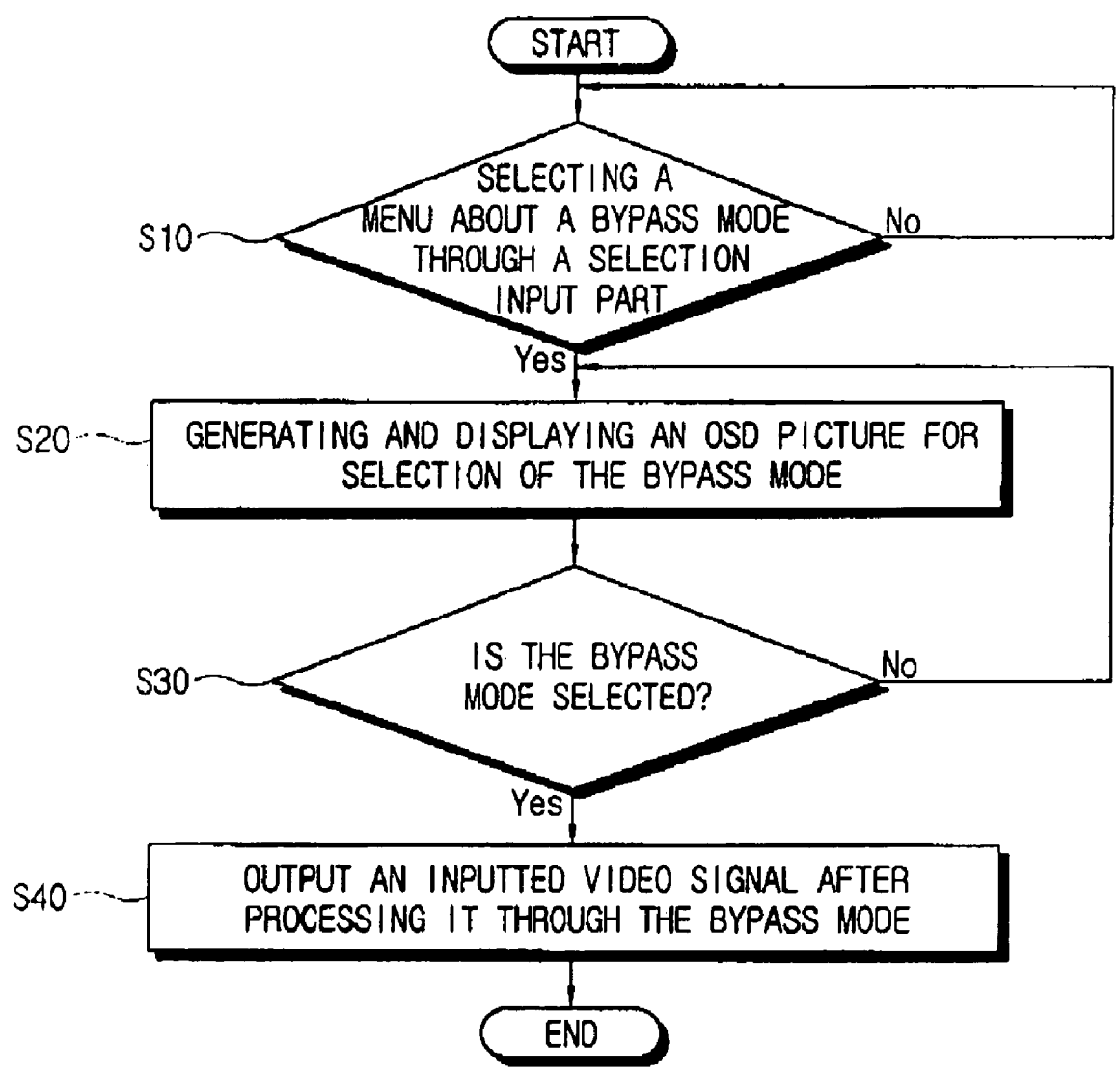
FIG. 3 is a flow chart of the display apparatus according to the first exemplary embodiment of the present invention.

As shown in FIG. 3, when the user selects the menu about the bypass mode through the input key provided separately and/or in a front part of the display apparatus at operation S10, the controller 400 controls the OSD generator and the display 100 to display the OSD menu picture after generating the OSD menu picture for selection of the bypass mode at operation S20.

If the user selects the bypass mode at operation S30, the controller 400 controls the video signal processor 200 to process the input video signal to pass through the bypass path based on the selected bypass mode at operation S40.

The controller 400 controls switching of the switch 250 to process the video signal through the path corresponding to the selected mode when the bypass mode is plural.

If the picture quality improving part 230 according to an embodiment of the present invention comprises the plurality of signal processing ICs, the video signal processor 200 of the display apparatus will be described by referring to FIG. 4 as follows. The repeated explanation with the foregoing embodiment will be omitted.

As shown in FIG. 4, the video signal processor 200 according to a second exemplary embodiment of the present invention comprises the processor 210 including the decoder 211 and the scaler 213, the picture quality improving part 230 including the de-interlacer 231 and the image-enhancer 233, a first switch 251 and a second switch 253.

The decoder 211 is connected to the scaler 213 and the de-interlacer 231 through the first switch 251. The scaler 213 is connected to the display 100 and the image-enhancer 233 through the second switch 253.

The input video signal is decoded through the decoder 211, and the decoded signal is output to the de-interlacer 231 or the scaler 213 by switching of the first switch 251 depending on whether or not the bypass mode is selected.

Then, the video signal processed in the scaler 213 is output to the display 100 or the image-enhancer 233 by switching of the second switch 253 depending on whether or not the bypass mode is selected.

As described above, the first switch 251 and the second switch 253 may be provided as a circuit within the decoder 211 and the scaler 213.

Also, the decoder 211 may comprise two paths connected to the de-interlacer 231 and scaler 213, and may output all of the processed video signals through the two paths. Further, the scaler 213 may comprise a switch circuit at an input terminal thereof so that the scaler 213 receives the video signal from the decoder 211 or the de-interlacer 231 and processes and outputs the video signal according to a controlling signal of the controller 400. Moreover, the display 100 may comprise the switching circuit at an input terminal thereof, and receive the video signal from the scaler 213 or the image-enhancer 233 and displays the video signal according to the controlling signal of the controller 400.

The bypass mode and the signal processing path corresponding thereto according to the second exemplary embodiment of the present invention will be described with reference to FIGS. 5 and 6.

When the user selects the menu depicting various bypass modes through the selection input part 300, the controller 400 controls the OSD generator to generate the OSD menu picture for selection of the bypass mode and the display 100 to display the OSD menu picture. On the display 100, the picture of the OSD menu is displayed, as shown in FIG. 5.

Figure 5:
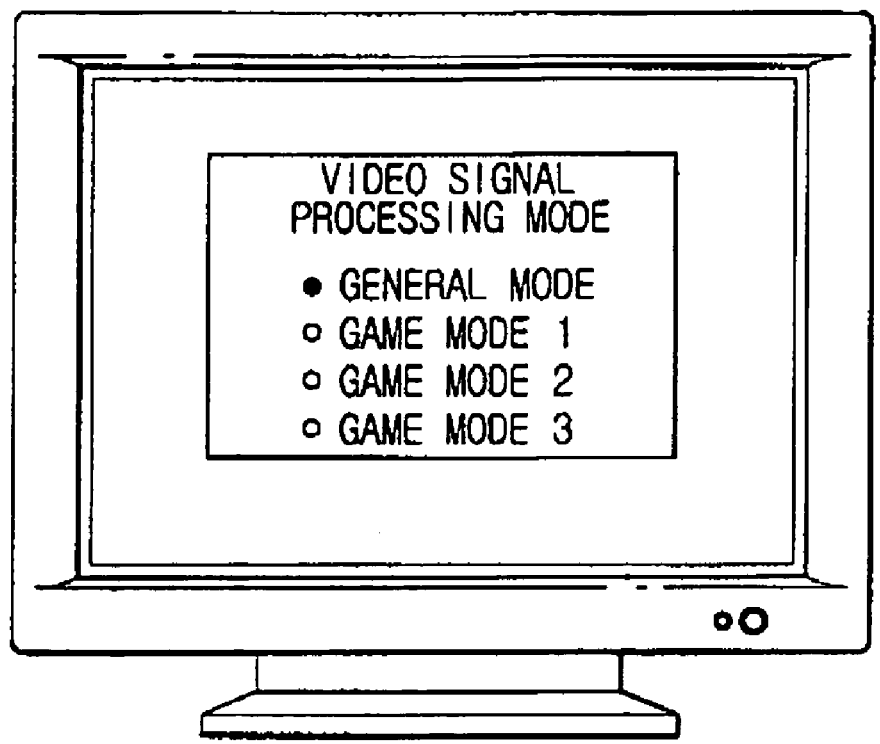
FIG. 5 illustrates an OSD menu picture regarding a video signal processing according to the second exemplary embodiment of the present invention.

In the example depicted in FIG. 5, four video signal processing modes may be selectable by the user through the selection input part 300.

Figure 6A:
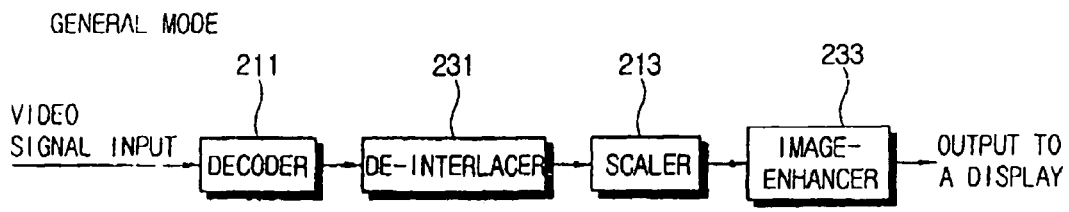
FIGS. 6A-D are example views illustrating a signal processing path corresponding to a bypass mode of a video signal according to the second exemplary embodiment of the present invention.

As shown in FIG. 6A, if the user selects a general mode, the controller 400 controls the video signal processor 200 to process the video signal through the decoder 211, the de-interlacer 231, the scaler 213, and the image-enhancer 233. Accordingly, if the bypass mode is not selected, this path through these ICs is referred to as a general processing path.

Then, the controller 400 outputs the controlling signal to the first switch 251 and the second switch 253 so as to control the first switch 251 and the second switch 253 to output the video signal to the de-interlacer 231 and the image-enhancer 233. The picture quality of the general mode is good, but the time for the signal processing is significantly delayed.

Figure 6B:
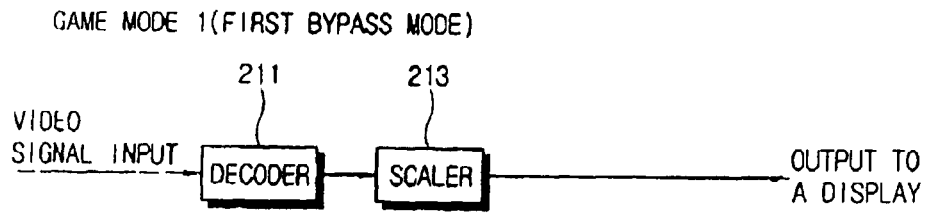

If the user selects a game mode 1 (first bypass mode), the controller 400 controls the video signal processor 200 to directly output the input video signal to the display 100 after processing through the decoder 211 and the scaler 213, as depicted in FIG. 6B.

The picture quality of the game mode 1 (first bypass mode) is worst among the video signal processing modes depicted in FIGS. 6A-6D, but the time for the signal processing in the game mode 1 is hardly delayed.

Figure 6C:
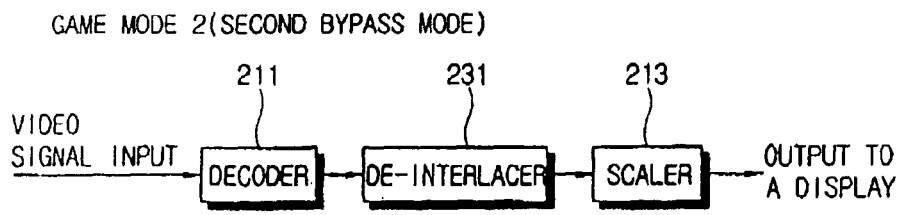

If the user selects a game mode 2 (second bypass mode), the controller 400 controls the video signal processor 200 to output the video signal to the display 100 after processing the input video signal through the decoder 211, the de-interlacer 231, and the scaler 213, as depicted in FIG. 6C.

Figure 6D:
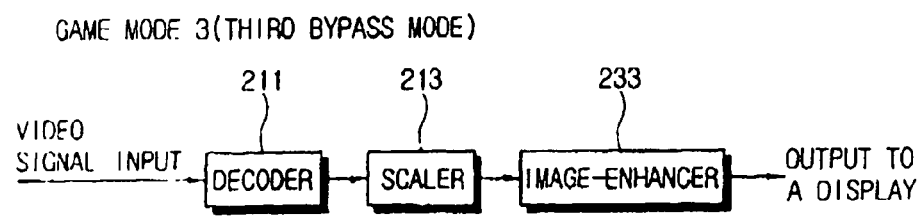

Further, when the user selects the game mode 3 (third bypass mode), the controller 400 controls the video signal processor 200 to output the video signal to the display 100 after processing the input video signal through the decoder 211, the scaler 213, and the image-enhancer 233, as depicted in FIG. 6D.

The picture quality of the game mode 2 and the game mode 3 is medium, but the delay time for the signal processing may be reduced a little with respect to the general mode.

As described above, if the picture quality improving part 230 comprises the plurality of picture quality improving ICs, various bypass modes may be provided. Because the various bypass paths are provided therein, the signal processing may be prevented from being delayed for the convenience of the user, when, for example, the user uses the external source requiring interaction with the user such as the game device, etc.

As described above, as an example, the picture quality improving IC comprises the de-interlacer 231 and/or the image-enhancer 233, also the picture quality improving IC may comprise various ICs in the video signal processing circuit and the display apparatus.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus having a display, the display apparatus
comprising:
a video signal processor comprising:
a processor which processes an input video signal, and
a picture quality improving part which improves picture quality of the processed video signal, wherein the video signal processor processes the video signal through a path comprising a signal processing path to selectively bypass the picture quality improving part;
a selection input part which receives a user input regarding a selection of a bypass mode corresponding to the signal processing path;
a switch which switches the video signal output from the processor to be output to at least one of the picture quality improving part and the display; and
a controller which controls the video signal processor to output the video signal processed through the processor to the display, after bypassing the picture quality improving part if the user selects the bypass mode through the selection input part,
wherein the picture ciuality improving part comprises a plurality of picture quality improving integrated circuits (ICs), and
the controller controls the video signal processor to bypass at least one of the plurality of picture quality improving ICs if the user selects the bypass mode through the selection input part.

2. The display apparatus according to claim 1, wherein the selection input part comprises an OSD generator which generates an OSD menu with the bypass mode and a predetermined input key to select the bypass mode through the OSD menu, and
the controller further comprises a mode setting part which sets a predetermined value corresponding to the bypass mode.

3. The display apparatus according to claim 1, wherein the processor comprises a decoder and a scaler which selectively receive the video signal output from the decoder, and
the picture quality improving ICs comprise a de-interlacer and an image-enhancer which selectively receive the video signal from the scaler.

4. The display apparatus according to claim 3, wherein the switch comprises a first switch which is configured to output the video signal output from the decoder to one of the scaler and the de-interlacer.

5. The display apparatus according to claim 4, wherein the switch further comprises a second switch which is configured to output the video signal output from the scaler to one of the display and the image-enhancer.

6. The display apparatus according to claim 5, wherein the controller controls the first switch and the second switch to respectively output the video signal from the decoder to the de-interlacer, and from the scaler to the display if the user selects a second bypass mode through the selection input part.

7. The display apparatus according to claim 5, wherein the controller controls the first switch and the second switch to respectively output the video signal from the decoder to the scaler, and from the scaler to the image-enhancer if the user selects a third bypass mode through the selection input part.

8. The display apparatus according to claim 5, wherein the controller controls the first switch and the second switch to respectively output the video signal from the decoder to the scaler, and from the scaler to the display if the user selects a first bypass mode through the selection input part.

9. The display apparatus according to claim 8, wherein the controller controls the first switch and the second switch to respectively output the video signal from the decoder to the de-interlacer, and from the scaler to the display if the user selects a second bypass mode through the selection input part.

10. The display apparatus according to claim 8, wherein the controller controls the first switch and the second switch to respectively output the video signal from the decoder to the scaler, and from the scaler to the image-enhancer if the user selects a third bypass mode through the selection input part.

11. A video signal processing circuit processing an input video signal and outputting the video signal to the display panel comprising:
a processor which processes the input video signal;
a picture quality improving part which improves picture quality of the processed video signal; and
a switch which switches output of the video signal processed through the processor to one of the picture quality improving part and the display panel; and a controller which controls the video signal processor to output the video signal processed through the processor to the display, wherein the picture quality improving part comprises a plurality of picture quality improving integrated circuits (ICs), and the controller controls the video signal processor to bypass at least one of the plurality of picture quality improving ICs if the user selects the bypass mode through the selection input part.

12. A video signal processing circuit comprising:

a decoder with outputs a video signal output;

a first switch connected to an output of the decoder a de-interlacer connected to a first output of the first switch;

a scaler connected to a second output of the first switch and to an output of the de-interlacer;

a second switch connected to an output of the scaler an image-enhancer connected to a first output of the second switch; and a display connected to a second output of the second switch, wherein the first switch switches output of a video signal output from the decoder to one of the scaler and the de-interlacer, and second switch switches output of the video signal output from the scaler to one of the image-enhancer and a display.

13. A method for avoiding delays associated with processing a video signal for a display, the method comprising:

receiving an input video signal by a processor;

inputting, by a user, a mode for processing the input video signal;

processing the received video signal according to the mode, wherein the mode comprises a general processing mode in which quality of the input video signal is enhanced and a bypass mode in which improving the quality of the received video signal is omitted, and a partial bypass mode in which the input video signal is only partially improved, and wherein the partial bypass mode takes less time to complete than the general processing mode and takes more time to complete than the bypass mode.

* * * * *

UNITED STATES PATENT AND TRADEMARK OFFICE
CERTIFICATE OF CORRECTION

PATENT NO. : 7,586,546 B2  Page 1 of 1
APPLICATION NO. : 11/268623
DATED : September 8, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 955 days.

Signed and Sealed this

Fourteenth Day of December, 2010

David J. Kappos
*Director of the United States Patent and Trademark Office*